United States Patent [19]
Roybal

[11] Patent Number: 5,826,538
[45] Date of Patent: Oct. 27, 1998

[54] ANIMAL FEEDER

[75] Inventor: Lorenzo Roybal, Erie, Colo.

[73] Assignee: Never Late, Inc., Erie, Colo.

[21] Appl. No.: 602,502

[22] Filed: Feb. 20, 1996

[51] Int. Cl.⁶ .................................................... A01K 5/00
[52] U.S. Cl. ........................................................ 119/51.12
[58] Field of Search ............................. 119/51.11, 51.12, 119/51.14, 51.15, 53.5, 54

[56] References Cited

U.S. PATENT DOCUMENTS

| | | | |
|---|---|---|---|
| 3,232,274 | 2/1966 | Chatfield | 119/51.12 |
| 3,599,608 | 8/1971 | Esquival | 119/51.12 |
| 3,638,618 | 2/1972 | Strother | |
| 3,763,825 | 10/1973 | Fleming | 119/51.12 |
| 3,916,837 | 11/1975 | Murto | 119/18 |
| 4,185,588 | 1/1980 | Harris | 119/51.12 |
| 4,248,175 | 2/1981 | Navarro | 119/51.12 |
| 4,644,903 | 2/1987 | Shaver | 119/51.12 |
| 5,265,560 | 11/1993 | Dobbins | 119/51.12 |
| 5,377,620 | 1/1995 | Phiillipi | 119/51.12 |

FOREIGN PATENT DOCUMENTS 2198327  12/1987  United Kingdom ............. A01K 5/02

*Primary Examiner*—Thomas Price
*Attorney, Agent, or Firm*—Patent Law Offices of Rick Martin, P.C.

[57] ABSTRACT

The present invention relates to a durable animal feeder comprising a pneumatically operated latch-release mechanism which operates to release the lid. The lid is attached to the box by hinge in a biased open position by spring cylinders. The pneumatic latch-release mechanism is actuated by a solenoid which controls the flow of pressurized air to the air piston which operates the lid latch. Once the lid latch is actuated, it releases the lid which then opens by operation of the spring cylinders. The solenoid receives an electric signal from a timer connected to a battery. The timer may also receive an RF signal from a remote RF transmitting source. All of the latch-release mechanisms are protectively contained within the animal feeder. A plurality of animal feeders having an external air jack can be connected as a barn system to a controller for individual animal feeder openings.

19 Claims, 3 Drawing Sheets

ANIMAL FEEDER

FIELD OF INVENTION

The present invention relates to an automatic animal feeder having a lid. The lid is held closed by a lid latch. The lid may be opened by automatic activation of the lid latch. A timer activated solenoid provides the means of operating the lid latch which allows a pneumatically actuated air piston to release the lid latch. Once the lid latch is released, the lid is raised by spring means to a fully open position, allowing the animal to feed.

BACKGROUND OF THE INVENTION

Horsemen and ranchers have used various means to achieve scheduled feeding of animals without the need for a person to be present to accomplish the feedings. Representative of the art is U.S. Pat. No. 4,185,588 (1980) to Harris. Harris teaches a pet feeding apparatus which comprises a box enclosing a feeding space with a door providing access to the feeding space. The door is spring biased in the open position. A latch member retains the door in the closed position. Timer means may be set to release the latch at a preset time. A timer-actuated electrical circuit system may also be used to disengage the latch member.

Other variations include U.S. Pat. No. 5,377,620 (1995) to Phillippi. Phillippi teaches a feeder for automatically providing an animal access to measured amounts of feed at pre-determined time intervals. The carousel has a number of trapezoidally-shaped feed compartments arranged around a central axis. An opening in a cover defines a feeding station. Each compartment containing feed is periodically moved into registry with the opening. After a compartment has remained at the opening for a pre-determined time, the carousel is rotated to bring the next compartment into registry with the opening.

U.S. Pat. No. 4,644,903 (1987) to Shaver relates to an automatic animal feeder for automatically exposing feed at pre-determined, substantially regular intervals. Two troughs side-by-side contain food. Each has a lid biased in the open position. A liquid operated mechanism operates to release each lid at a pre-determined time.

U.S. Pat. No. 3,763,825 (1973) to Fleming teaches a pet feeder comprising a cabinet internally divided into a plurality of separate compartments opening individually. Each door has a latch which is actuated by a timer to release the door latch at stated time intervals.

U.S. Pat. No. 3,638,618 (1972) to Strother relates to a pet feeder with a spring-opened door. The door is held in a closed position by electric solenoids. A timer actuates the electric solenoids to cause the door to open at timed intervals.

U.S. Pat. No. 3,599,608 (1971) to Esquival relates to a container in which a dish of pet food may be placed with a cover which is closed until feeding time. The latch is released at feeding time by a time clock.

U.S. Pat. No. 3,232,274 (1966) to Chatfield et al. relates to a time-released pet-feeding device comprising a body with a flat cover over the feeding indentation. The flat cover is biased by spring means in the open position. A timer device actuates the lock knob which releases the latch at a pre-selected time to open the flat cover.

Each of the cited devices operates to provide feed to animals at pre-determined time intervals. Each is independent of outside interaction and operates independently of outside control once the lid release mechanism is actuated. It is not possible with these devices to remotely alter the opening times of each unless the operator physically interacts with each to alter the release time. This may cause problems to an operator. If a scheduled feeding must be changed, the operator must be present to reset the opening time. This defeats the labor-saving intent of each device. Further, none of the prior art allows discretionary remote operation of the feeder at a time chosen by the operator.

The present invention solves these problems by providing an animal feeder which may be set to operate at any time by the operator at any time.

SUMMARY OF THE INVENTION

The main object of the present invention is to provide an animal feeder which operates automatically to provide feed to animals.

Another object of the present invention is to provide an animal feeder which may be operated remotely at any time by the operator.

Another object of the present invention is to provide an animal feeder with all of the operating mechanisms contained in such a way so as to prevent damage thereto by the animals being fed.

Another object of the present invention is to provide an animal feeder which is constructed of durable materials.

Another object of the present invention is to provide an animal feeder which is portable and may be conveniently and easily placed in any appropriate location to accomplish the feeding.

Another object of the present invention is to provide an animal feeder which operates safely on compressed air and low voltage DC electricity.

Another object of the present invention is to provide an animal feeder which may accommodate a wide variety of feeds.

Another object of the present invention is to provide an animal feeder which is easily maintained.

Another object of the present invention is to provide an animal feeder which is comprised of non-toxic materials.

Another object of the present invention is to provide an animal feeder constructed of modular, replaceable, inexpensive, and readily available parts.

Other objects of this invention will appear from the following description and appended claims, reference being made to the accompanying drawings forming a part of this specification wherein like reference characters designate corresponding parts in the several views.

The present invention is an animal feeder which is self-contained and will automatically operate to feed animals. The animal feeder requires no interaction from a person once activated. The present invention is also safe for use with animals in that it uses compressed air and low voltage DC electricity for power. The air reservoir (probably a small tire) is charged with compressed air to approximately 30–60 psig. The air reservoir placed inside the feeder box and is connected in series by tube to a solenoid which is then connected to an air-piston-operated latch. The solenoid is operated by a low voltage DC electric signal received from a portable 12-volt battery source. The electric signal may be initiated by any number of means including a timer, or by operation of a pager attached to the timer by receipt of an RF signal from a remote source such as another telephone pager. Once the electric signal is received by the solenoid, it operates to allow the air from the air reservoir to flow to the air-piston operated latch. The piston releases the latch. The lid of the animal feeder is attached to a spring means in a biased open position. The spring means may include an air piston or a spring cylinder known to those in the art Once the latch is released, the lid extends to the fully open position, thereby allowing the animal access to the feed. All of the elements of the present invention are contained within the durable feeder box to avoid any damage to the components which may be caused by rough handling or a hungry animal.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
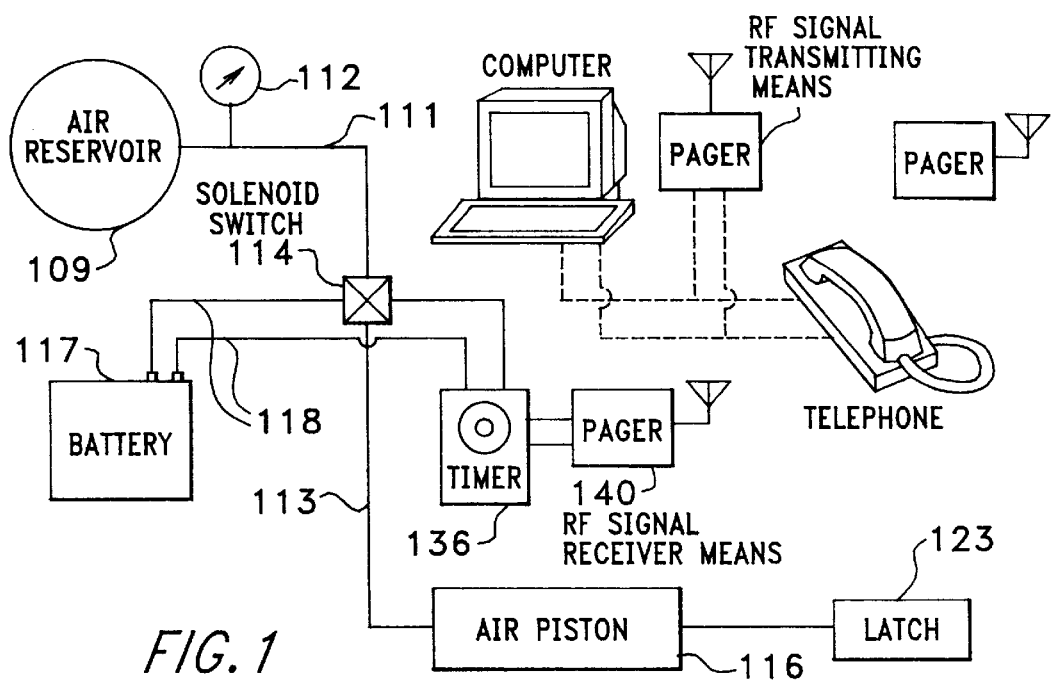
FIG. 1. is a schematic view of the latch release mechanism depicting each of the constituent parts.

Referring first to FIG. 1 a schematic view of the latch release mechanism is shown. Air reservoir 109 is connected to solenoid 114 by tube 111. Solenoid 114 is connected to the air piston 116 by tube 113. Tube 111 and tube 113 transport the compressed air contained in air reservoir 109 to air piston 116. Air piston 116 is mechanically connected to latch 123. Also included in the air circuit is solenoid 114 which is electrically connected to battery 117 by wire 118 in an electric circuit with timer 136. Upon a preset time, timer 136 closes the electric circuit and an electric signal causes solenoid 114 to open to allow the compressed air to flow from tube 111 through tube 113 to the air piston 116. The electric signal to actuate the solenoid 114 may also be initiated remotely by receipt of pager 140 of an RF signal transmitted by including but not limited to a telephonic pager, cellular telephone, telephone, and computer. Pager 140 is located on the timer 136 or in parallel with the timer 136. Upon receipt of the RF signal, the electric signal is initiated and transmitted to actuate solenoid 114.

Figure 2:
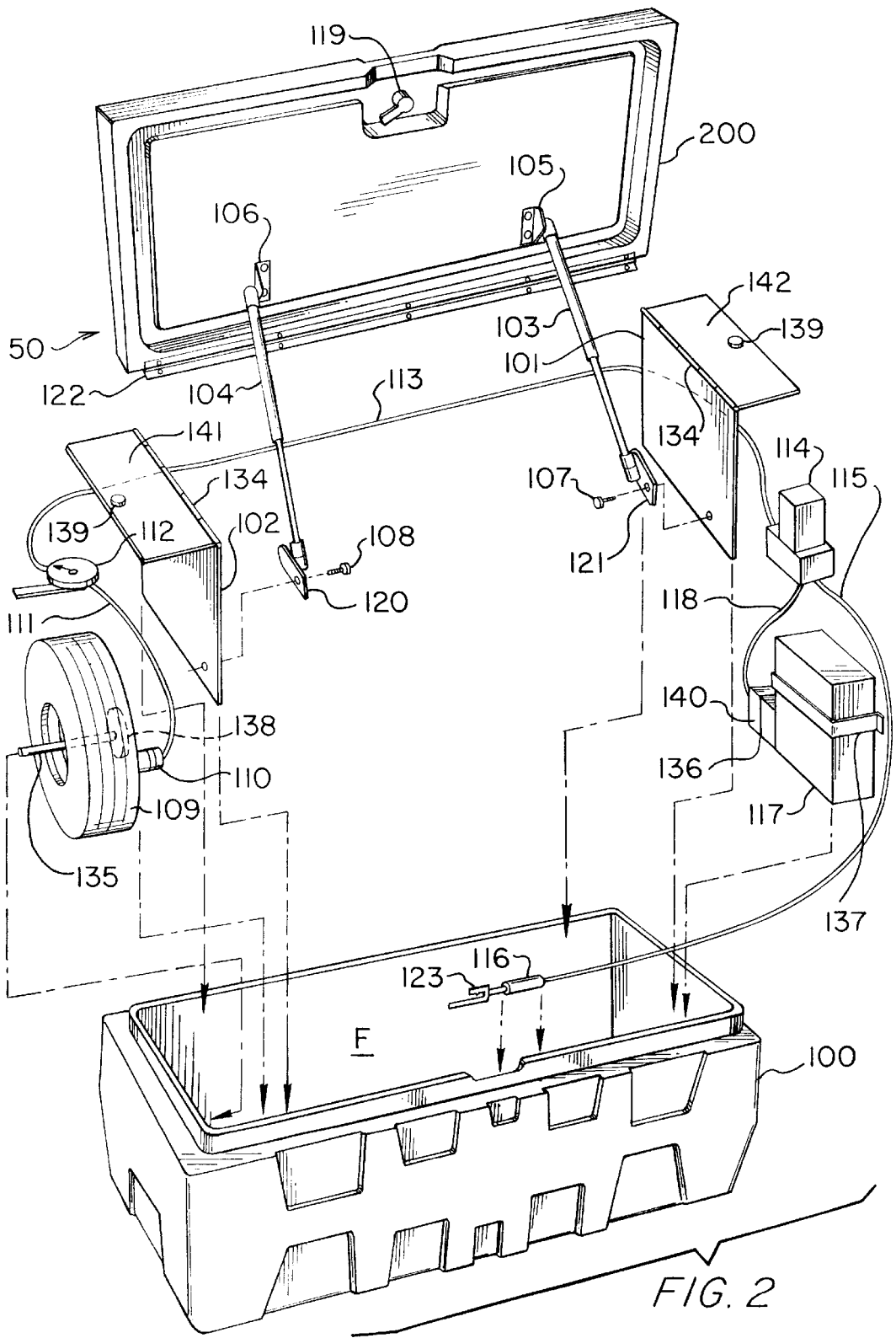
FIG. 2 is an exploded perspective view of the preferred embodiment depicting each of the component parts.

Referring next to FIG. 2 an exploded perspective view of the preferred embodiment depicts each of the component parts. The animal feeder 50 is a self-contained device comprising a box 100 having a lid 200 connected by hinge 122 to the top of box 100. The internal area of the box 100 is divided into three areas including the feed area F. Guard panel 102 is mounted in the interior left side of the box 100. It has a cover 141 having a lock 139 attached by hinge 134. Guard panel 101 is also mounted in the interior right side of the box 100. It has a cover 142 having a lock 139 attached by hinge 134. Within the compartment created by guard panel 102 is contained the air reservoir 109. Air reservoir 109 is detachably connected to tube 111 by tube coupling 110. Installed between tube 111 and tube 113 is a pressure gauge 112 to indicate the pressure of air reservoir 109. Air reservoir 109 is removeably mounted to the interior surface of the box 100 by bolt 135 and nut 138. Within the compartment created by guard panel 101 is contained solenoid 114. Solenoid 114 is connected by wire 118 to timer 136 and pager 140 which are then electrically connected to battery 117. Solenoid 114 is also pneumatically connected in series to air reservoir 109 by tube 111 and 113 and to air piston 116 by tube 115. Battery 117 is removably mounted to the interior of box 100 by strap 137.

The lid 200 is attached to box 100 by hinge 122. Attached to the inner surface of the lid 200 are mounting brackets 105 and 106. One end of spring cylinder 103 is attached to mounting bracket 105 while the other end is attached to mounting bracket 121. Mounting bracket 121 is attached to the surface of guard panel 101 facing feed area F by screw 107. Spring cylinder 104 is attached to mounting bracket 106 with the other end attached to mounting bracket 120. Mounting bracket 120 is attached to the surface of guard panel 102 facing feed area F by screw 108. Spring cylinder 103 and 104 cause the lid 200 to be biased in the "open" or "up" position. Lid latch 119 is installed in the edge of lid 200 remote from hinge 122. Lid latch 119 communicates with latch 123 installed in box 100. Upon actuation of latch 123 by the air piston 116, latch 123 rotates about its axis, thereby releasing lid latch 119. The spring cylinder 103 and 104 then push lid 200 into the "open" or "up" position.

Figure 3:
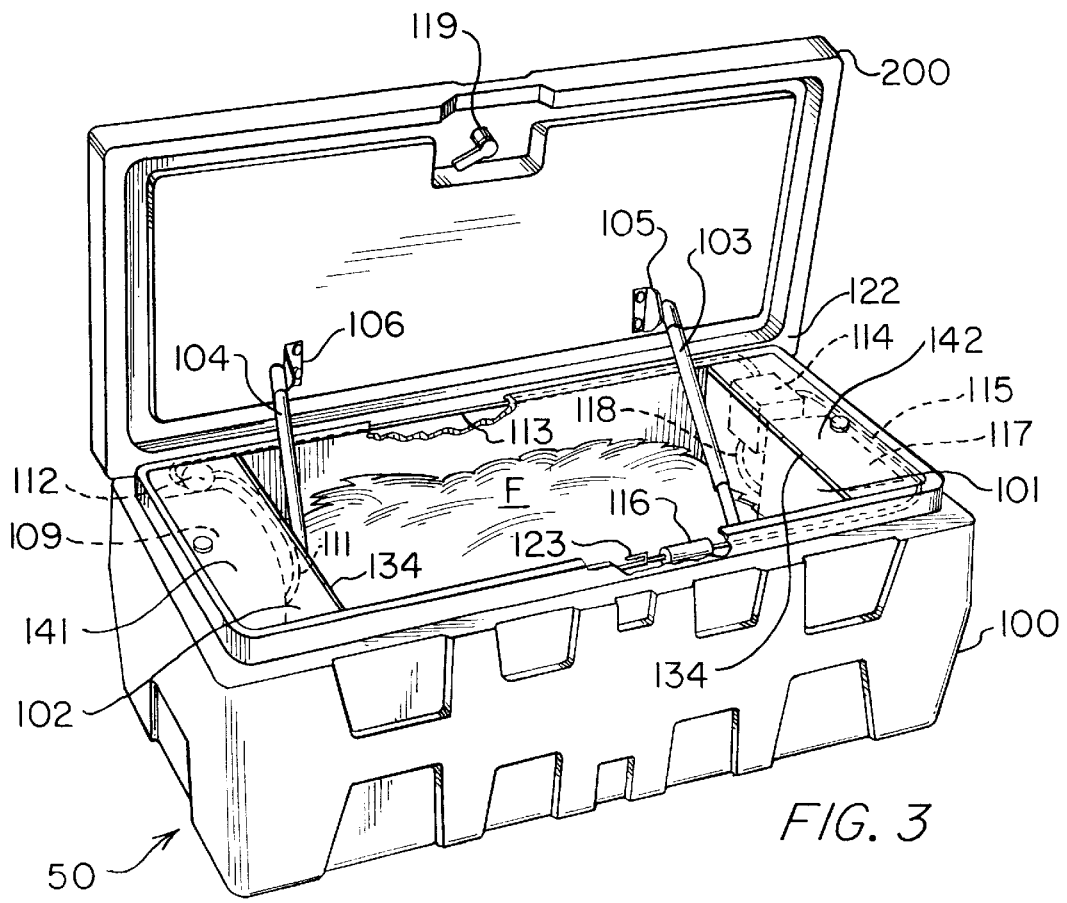
FIG. 3 is a perspective view depicting the preferred embodiment fully assembled with the lid open and the feed contained within.

Referring next to FIG. 3 a perspective view depicts the preferred embodiment fully assembled with the lid open and the feed contained within the feed area F between guard panels 101 and 102. Guard panels 101 and 102 prevent feed from coming in contact with the latch release mechanism components and prevent the animal from damaging the latch release mechanism.

Figure 4:
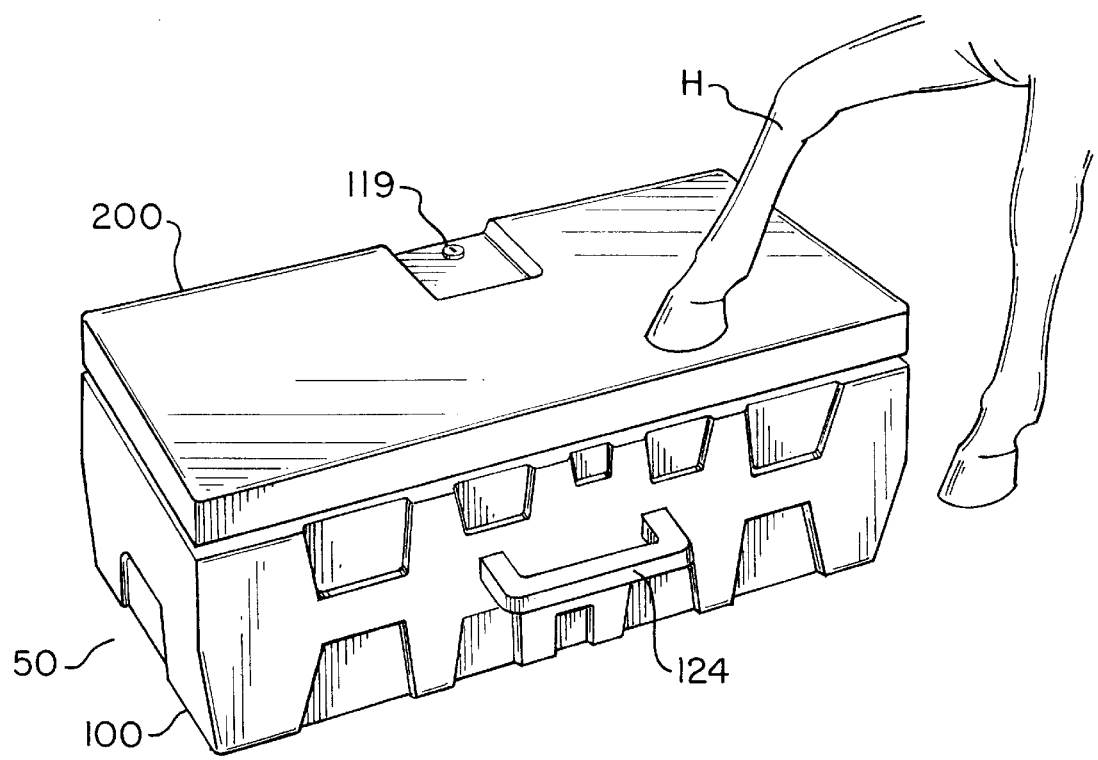
FIG. 4 is a perspective view of the preferred embodiment with the lid closed prior to opening.

Referring next to FIG. 4 a perspective view is shown of the preferred embodiment with the lid closed. With the lid 200 closed and latched by lid latch 119 the animal feeder 50 is in a mode to be placed within the stall or other animal containing area. Handle 124 is installed on the exterior of box 100 allowing ease of handling of the animal feeder 50. Box 100 and lid 200 are constructed of durable materials allowing them to withstand repeated impacts from an animal such as horse H.

Figure 5:
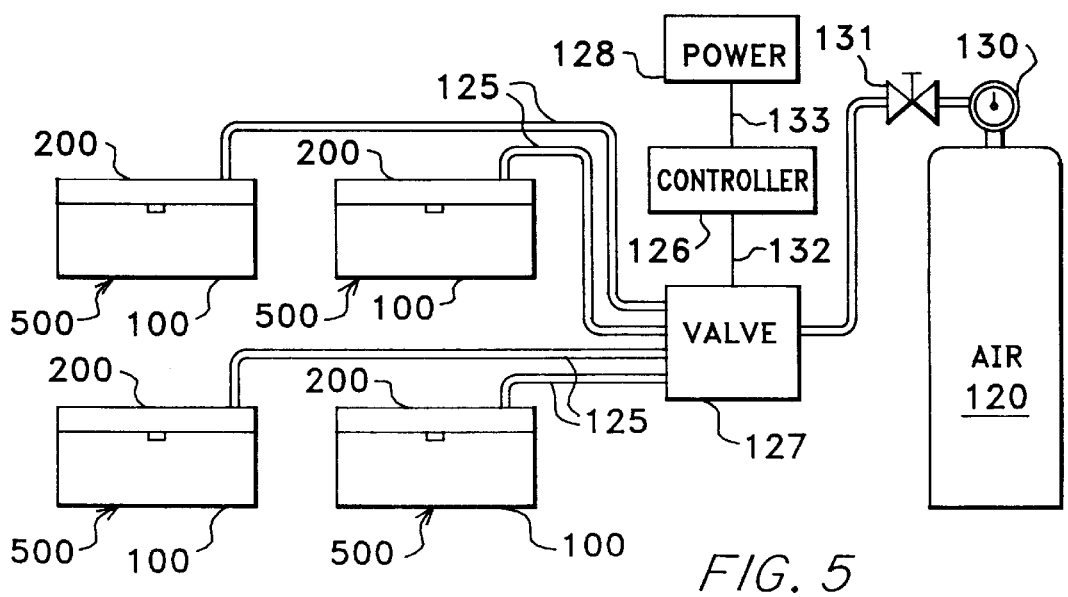
FIG. 5 is a schematic drawing depicting an alternative embodiment in which the animal feeders may be manifolded together such as in a barn with several stalls.

Referring next to FIG. 5 a schematic drawing depicts an alternate embodiment. A number of animal feeders 500 may be connected by manifold to a common valve 127. Each manifold tube 125 replaces each individually contained air reservoir 109 of FIG. 2. Valve 127 is electrically connected to timer 126 which is electrically connected to power source 128. Valve 127 is also connected to air source 129 through isolation value 131. Pressure gauge 130 is mounted on air source 129. Air source 129 may comprise a compressed air cylinder or air compressor. Controller 126 (equivalent to a lawn sprinkler controller) operates to send an electric signal to valve 127. Valve 127 then opens to send compressed air to each animal feeder 50 simultaneously or sequentially at the discretion of the operator. The controller 126 may also be actuated by receipt of an RF signal transmitted by an RF transmitting device including but not limited to a computer, telephone pager, cellular telephone, telephone, or other device.

Although the present invention has been described with reference to preferred embodiments, numerous modifications and variations can be made and still the result will come within the scope of the invention. No limitation with respect to the specific embodiments disclosed herein is intended or should be inferred.

KEY

50. Animal feeder
100. Box

101. Guard panel
102. Guard panel
103. Spring Cylinder
104. Spring Cylinder
105. Mounting Bracket
106. Mounting Bracket
107. Screw
108. Screw
109. Air Reservoir
110. Tube Coupling
111. Tube
112. Pressure Gauge
113. Tube
114. Solenoid
115. Tube
116. Air piston
117. Battery
118. Wire
119. Lid latch
120. Mounting bracket
121. Mounting bracket
122. Hinge
123. Latch
124. Handle
125. Manifold tube
126. Controller
127. Valve
128. Power
129. Air source
130. Pressure gauge
131. Isolation valve
132. Wire
133. Wire
134. Hinge
135. Bolt
136. Timer
137. Strap
138. Nut
139. Lock
140. Pager
141. Cover
142. Cover
200. Lid
500. Animal feeder having an external air jack
F. Feed area

I claim:

1. An animal feeder comprising:
   a box having an open top;
   a lid covering the open top and having an open and a closed position;
   a spring means functioning to bias said lid in the open position;
   a latch means functioning to hold said lid in the closed position;
   a tube connecting an air reservoir to a solenoid to an air piston and to the latch means;
   a power means functioning to energize said solenoid; and
   a timer means functioning to actuate said solenoid, thereby charging said air piston with air, releasing said latch means, and permitting the spring means to bias the lid in the open position.

2. The animal feeder of claim 1 further comprising an RF signal receiving means, whereby said solenoid may be actuated by a remote RF signal generator.

3. The animal feeder of claim 1, wherein said air reservoir further comprises a removable container.

4. The animal feeder of claim 1, wherein said power means is removably attached within said box.

5. The animal feeder of claim 1, wherein said spring means further comprise spring cylinders.

6. The animal feeder of claim 3, wherein the removable container further comprises a tire.

7. The animal feeder of claim 1, wherein said lid further comprises a lock to prevent unauthorized opening of said lid.

8. An animal feeder comprising:
   a box having a hinged top lid;
   an air reservoir connected to a solenoid and subsequently connected to an air piston and subsequently connected to a latch means;
   said latch means functioning to hold said top lid in a closed position;
   spring means functioning to bias said top lid in an open position;
   a power means; and
   a timer means functioning to cause said power means to actuate said solenoid, thereby releasing pressurized air from said air reservoir, actuating said air piston, and permitting the spring means to bias said top lid to the open position.

9. The animal feeder of claim 8, wherein said timer further comprises an RF signal receiving means to provide a remote actuation of the timer.

10. The animal feeder of claim 8, wherein said top lid further comprises a lock which communicates with said latch means.

11. The animal feeder of claim 8, wherein said spring means further comprise spring cylinders.

12. The animal feeder of claim 8, wherein said air reservoir further comprises a removable container.

13. The animal feeder of claim 12, wherein said power means is removeably attached within said box.

14. The feeder of claim 13, wherein said latch release means further comprises:
    an air piston pneumatically communicating with a solenoid;
    a timer functioning to actuate a power means which closes a circuit to actuate said solenoid, thereby causing said solenoid to pneumatically communicate with an air reservoir to cause pressurized air to flow through said solenoid from said air reservoir to said air piston to actuate said latch means.

15. The feeder of claim 14, wherein said timer further comprises a remote actuation means functioning to provide on demand remote opening of the feeder.

16. The feeder of claim 14, wherein said spring means further comprise spring cylinders.

17. The feeder of claim 14, wherein said power means further comprises a removable attachment within said box.

18. The feeder of claim 14, wherein said air reservoir further comprises a removable attachment within said box.

19. A feeder system comprising:
    a plurality of boxes each having a lid;
    said boxes each further comprising an external air jack each of which is pneumatically connected to an air reservoir;
    said boxes each further comprising a spring means biasing each of said lids in an open position;
    said boxes each further comprising a latch means, wherein each of said latch means functions to hold each of said lids in a closed position until said latch means is released;
    a release means functioning to controllably release said latch means; and
    said valve further comprising an electrical communication with a controller means, whereby said controller means causes said valve to open said boxes simultaneously and sequentially.

* * * * *